April 1, 1969 R. F. STELZER 3,435,844
CONTROL VALVE
Filed Aug. 22, 1966

INVENTOR
RAYMOND F. STELZER
BY
Joseph E. Pagen

United States Patent Office 3,435,844
Patented Apr. 1, 1969

3,435,844
CONTROL VALVE
Raymond F. Stelzer, Bel Nor, Mo., assignor, by mesne assignments, to Wagner Electric Corporation, a corporation of Delaware
Filed Aug. 22, 1966, Ser. No. 573,915
Int. Cl. F16k 17/26, 15/12
U.S. Cl. 137—522
18 Claims

ABSTRACT OF THE DISCLOSURE

A control valve having a valve member movable in response to control fluid pressure supplied thereto in excess of and less than a predetermined value to effect pressure fluid flow through said control valve in opposite directions and in only one direction, respectively.

---

Figure 1:
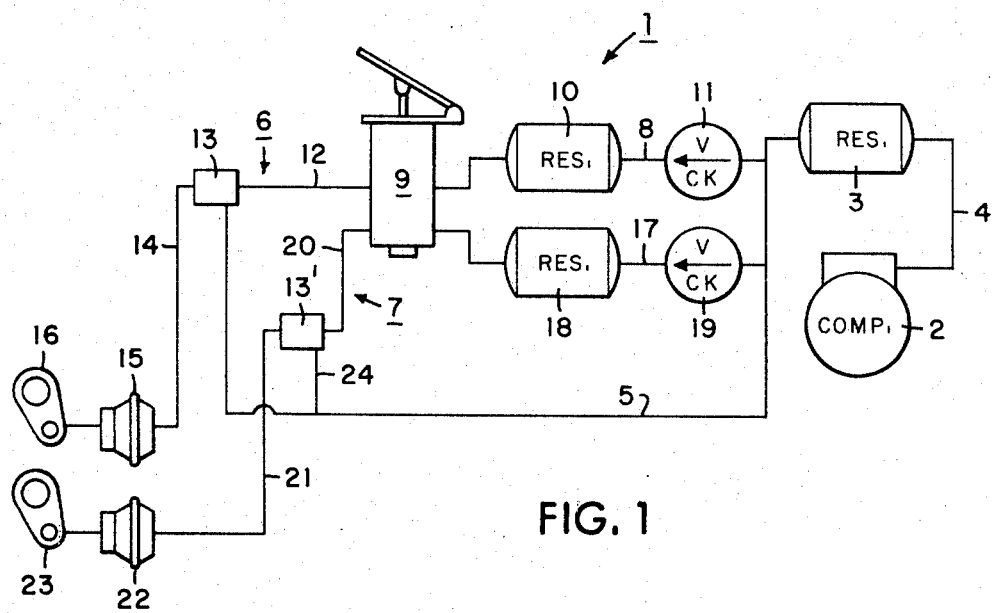

This invention relates to fluid pressure systems and in particular to a control valve for use in such a fluid pressure system.

In the past, fluid pressure systems have been provided with means therein for automatically applying the vehicle brakes and for retaining said brakes in their actuated positions if the fluid pressure in the system dropped below a predetermined value. However, by applying the brakes automatically and without the vehicle operator's knowledge, these prior art fluid pressure systems had the undesirable feature of unexpectedly applying the brakes, whereby the possibility of loss of operator control of the vehicle was established. Other prior art fluid pressure systems had the undesirable feature of not making any provision for retaining the brakes in their actuated positions during a braking application when the fluid pressure in the system had dropped below a value sufficient for another safe braking application.

It is, therefore, a general object of the present invention to provide a novel control valve for use in a fluid pressure system which overcomes the aforementioned undesirable features.

Another object of the present invention is to provide a novel control valve for use in a fluid pressure system which automatically retains the fluid pressure system in its actuated position when the fluid pressure in the system falls below a predetermined value.

Another object of the present invention is to provide a novel control valve for use in a fluid pressure system which permits pressure fluid flow therethrough to and from the vehicle brakes when the fluid pressure in said system is above a predetermined value and which only permits pressure fluid flow therethrough to said brakes when the fluid pressure in said system is below the predetermined value.

Still another object of the present invention is to provide a novel control valve of simplified construction and economy of manufacture.

These and other objects and advantages will become apparent hereinafter.

Briefly, the present invention comprises a control valve having control means defining therewith a pressure fluid flow passage and an expansible fluid pressure chamber, said control means being responsive to fluid pressure in said chamber above a predetermined value to permit pressure fluid flow through said passage in oppose directions and being responsive to fluid pressure in said chamber less than the predetermined value to permit pressure fluid flow through said passage in only one direction.

Figure 2:
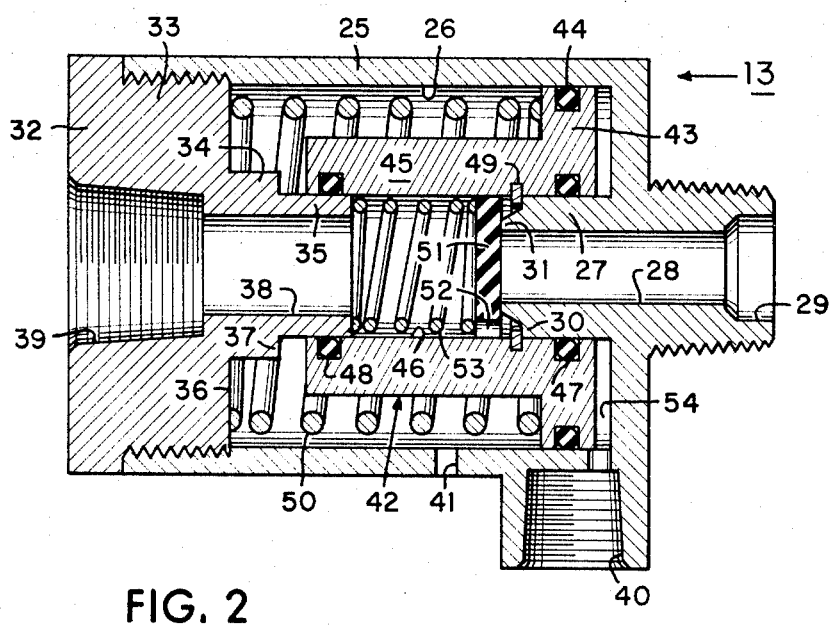

In the drawings which illustrate embodiments of the invention,

FIG. 1 is a diagrammatic view of a fluid pressure system having control valve means therein embodying the present invention, and FIG. 2 is an enlarged cross-sectional view of the control valve means of FIG. 1.

Referring now to the drawings and in particular to FIG. 1, a dual or separate fluid pressure system 1 for a vehicle is shown having fluid pressure generating means or a compressor 2 connected with a system or main reservoir 3 by a conduit 4. An emergency conduit 5 is connected to the reservoir 3 and said conduit is intersected by separate fluid pressure branches, indicated generally at 6 and 7. The branch 6 includes a conduit 8 connected in parallel circuit relation between the delivery line 5 and one of a pair of inlet ports in a tandem or split application valve 9, and a branch reservoir 10 and check valve 11 are interposed in the conduit 8 with said check valve providing uni-directional pressure fluid flow from the main reservoir 3 to the branch reservoir 10. The application valve 9 is also povided with a pair of separate outlet ports, and an application or service line or conduit 12 connects one of said outlet ports with the inlet port of a control or emergency brake retention valve 13. Another conduit 14 connects the outlet port of the control valve 13 with a fluid pressure responsive motor or brake chamber 15 which is operatively connected with linkage means, such as a slack adjuster 16, to control the energization of a friction device or wheel brake assembly on one of the vehicle axles (not shown). The branch 7 includes a conduit 17 in parallel circuit relation between the emergency line 5 and the other of the inlet ports of the application valve 9, and a branch reservoir 18 and check valve 19 are interposed in the conduit 17, with said check valve providing uni-directional pressure fluid flow from the main reservoir 3 to the branch reservoir 18. An application or service line or conduit 20 has one end connected with the other outlet port of the application valve 9, and the other end thereof is connected to the inlet port of another control or emergency brake retention valve 13' which is identical to the control valve 13. Another conduit 21 connects the outlet port of the control valve 13' with a fluid pressure responsive motor or brake chamber 22 which is operatively connected with linkage means, such as a slack adjustor 23, to control the energization of a friction device or wheel brake assembly on the other of the vehicle axles (not shown). To complete the description of the fluid pressure system 1, it should be noted that the emergency conduit 5 connects the main reservoir 3 with the emergency or control port of the control valve 13 and another conduit 24 has one end connected to the emergency conduit 5 and the other end thereof connected to the emergency or control port of the control valve 13'.

For purposes of illustration, the dual fluid pressure system is shown having identical control valves 13 and 13' therein, but it should be understood that the control valve 13 could be used in a single fluid pressure system. Since the control valves 13 and 13' are identical, only the control valve 13 will be described. Referring now to FIG. 2, the control valve 13 comprises a housing 25 having a bore 26 therein. An extension 27 is formed on the rightward end of the housing 25 extending axially into the bore 26 and another bore 28 extends axially through said extension and the rightward end of said housing. The rightward end of the bore 28 defines an inlet or connecting port 29 which receives the conduit 12, as previously mentioned, and the leftward or free end 30 of the extension 27 defines a valve seat 31 thereon in circumscribing relation with the bore 28. A stepped plug or closure member 32 is provided with a large leftward end 33 which is threadedly received in the leftward end of the bore 26 and the intermediate and smaller stepped portions 34, 35 thereof extend into said bore substantially coaxial with the extension 27. An abutment shoulder 36 is defined on the plug member 32 at the intersection of the larger and intermediate portions 33, 34 thereof and another shoulder 37 is defined on said plug member at the intersection of the intermediate and small portions 34, 35 thereof. A bore 38 extends through the plug member 32 which is substantially aligned with the bore 28 in the extension 27 and the leftward end of the bore 38 defines an outlet or connecting port 39 which receives the conduit 14, as previously mentioned. An emergency or control port 40 which receives the conduit 5, as previously mentioned, is provided in the housing 25 connecting with the bore 26 adjacent to the rightward end thereof, and a vent passage 41 is provided in said housing connecting with said bore adjacent the mid-portion thereof.

A valve control member, indicated generally at 42, is provided with a head portion 43 having a peripheral seal 44 thereof for sliding sealing engagement with the bore 26 and a sleeve portion 45 is integrally formed on said head portion and extends leftwardly therefrom. A bore 46 extends through the sleeve and head portion 43, 45 and a pair of seals 47, 48 are provided in said bore adjacent to the opposed ends of the control member 42 for sliding sealing engagement with the periphery of the extension 27 and the periphery of the smaller stepped portion 35 of the plug member 32, respectively. An abutment or stop ring and groove assembly 49 is provided in the control member bore 46 between the seals 47, 48, and a spring 50 is concentrically aligned with said sleeve portion and biased between the head portion 43 and the abutment 36 on the plug 32 normally urging the control member 42 rightwardly to engage the abutment 49 with the abutment or free end 30 of the extension 27. A valve member 51 is movable in the bore 46 and has a plurality of passages 52 extending therethrough adjacent to the periphery thereof, and a spring 53 biased between said valve member and the rightward end of the plug 32 normally urges said valve member into sealing engagement with the valve seat 31.

To complete the description of the control valve 13, it should be noted that an expansible fluid pressure control chamber 54 is defined between the bore 26 and the periphery of the extension 27 between the head portion 43 and the rightward end of the housing 25 in open pressure fluid communication with the control port 40. Also, it should be noted that a pressure fluid flow passage through the control valve 13 is defined by the bore 28 in the extension 27, the bore 46 in the control member 42, and the bore 38 in the plug member 32.

In the operation of the fluid pressure system 1, the compressor 2 displaces pressure fluid through the conduit 4 into the main reservoir 3. The displaced pressure fluid flows from the reservoir 3 through the conduit 5 into the control ports 40 of the control valves 13, 13 and through the conduits 5 and 24. Also, the fluid pressure flows from the conduit 5 through the conduit 8, the unidirectional valve 11 and into the reservoir 10 of the branch 6, and through the conduit 17, the uni-directional valve 19 and into the reservoir 18 of the branch 7.

Because the control valves 13 and 13' are identical and function in the fluid pressure system 1 in substantially the same manner, only the operation of the control valve 13 in the fluid pressure branch 6 will be described in great detail. In the operation of the control valve 13 with the component parts thereof positioned as hereinabove described and as shown in FIG. 2, there is little or no fluid pressure in the system 1. Since the fluid pressure chamber 54 and the control port 40 in the control valve 13 are in direct pressure fluid communication with the main reservoir 3 through the conduit 5, any fluctuation in said main reservoir will directly affect the fluid pressure in said chamber. When the fluid pressure in the reservoir 3 and the fluid pressure chamber 54 is increased above a predetermined value, the force created by the predetermined fluid pressure in said chamber acting on the effective area of the head portion 43 of the control member 42 therein overcomes the force of the spring 50 thereby serving to urge said control member leftwardly toward a position engaging the abutment 49 with the valve member 51 to form a driving connection therebetween. Thereafter, the leftward movement of the control member 42 effects the driving connection with the valve member 51 to move said valve member to a position disengaged from the valve seat 31 to permit unobstructed or bi-directional pressure fluid flow through the bore 46 and the control valve 13. This leftward movement of the control member 42 in response to fluid pressure in the chamber 54 is limited by the leftward end of said control member engaging the abutment 37 on the plug member 32.

Therefore, when fluid pressure in excess of the predetermined value is available in the system 1 for a safe braking application, the valve member 51 is unseated from the valve seat 31, as hereinabove described, and the control valve 13 permits bi-directional pressure fluid flow therethrough. Thus, under normal operating conditions, the control valve 13 provides open pressure fluid communication therethrough for the branch 6 of the fluid pressure system 1, and the operator may apply and release the brakes without the control valve 13 affecting the operation of said fluid pressure system.

If the operator desires to effect a braking application, a manually applied force to the application valve 9 establishes pressure fluid flow in the branch 6 from the reservoir 10 into the conduit 12 and the inlet port 29 of the control valve 13 and therefrom through the bore 28 in the extension 27, the passages 52 in the valve member 51, the bore 46 in the control member 42, the bore 38 in the plug member 32, and the outlet port 39 of said control valve into the conduit 14 to actuate the brake chamber 15 which, in turn, rotates the slack adjustor 16 to energize the wheel brake assemblies associated therewith. When the desired braking effect is obtained, the manually applied force is removed from the application valve 9 preventing further pressure fluid flow therethrough from the reservoir 10, and the displaced fluid pressure energizing the wheel brake assemblies in the branch 6 returns through said system, retracing the path followed for energization, to the application valve 9 where the fluid pressure is then exhausted to the atmosphere.

In the event of fluid pressure failure due to leaks or the like in the void pressure branch 7, it is obvious that the fluid pressure in the main reservoir 3 will be diminished in an attempt to replenish the depleted fluid pressure in the branch reservoir 18 which will therefore diminish the fluid pressure in the chamber 54 of the control valve 13. Also, if a leak occurs in the main reservoir 3 or the compressor 2 fails, the fluid pressure in the chamber 54 will be reduced while the check valve 11 will prevent the fluid pressure in the reservoir 10 from being depleted. When the fluid pressure in the chamber 54 is reduced below the predetermind value, the force of the spring 50 urges the control member 42 rightwardly to engage the stop ring 49 with the abutment 30 on the extension 27. With the control member 42 moved to its rightward position, the spring 53 urges the valve member 51 into sealing engagement with the valve seat 31, and said valve member in this position permits only uni-directional pressure fluid flow through the control valve 13 to energize the brake chamber 15 associated therewith while preventing the exhaustion of pressure fluid from said brake chamber. Thereafter, when the operator desires to effect a braking application, the manually applied force to application valve 9 will establish fluid pressure flow from the branch reservoir 10 into the inlet port 29 of the control valve 13. This displaced fluid pressure acts on the rightward face of the valve member 51 to urge said valve member leftwardly from the valve seat 31 thereby establishing pressure fluid flow through the control valve 13 for energization of the brake chamber 15, as described hereinabove. It should be noted that even with fluid pressure existing in only the fluid presssure branch 6, an effective braking application may be made since the valve member 51 is free to move from the valve seat 31 without regard to the amount of fluid pressure available in the main reservoir 3 and irrespective of the operation of the branch 7. When the manually applied force to the application valve 9 is removed, the displaced fluid pressure acting on the rightward face of the valve member 51 is exhausted to atmosphere, as described hereinbefore, and said valve member is urged by the spring 53 into engagement with the valve seat 31. With the valve member 51 engaging the valve seat 31, the pressure fluid flow from the outlet port 39 to the inlet port 29 is prevented so that the displaced pressure fluid cannot return to the application valve 9 and be vented to the atmosphere. Therefore, the displaced fluid pressure is retained in the system between the control valve 13 and the brake chamber 15 and the brakes associated therewith are retained in their activated or energized positions when the fluid pressure in the main reservoir 3 and the fluid pressure system 1 is below the predetermined value.

As previously stated, the control valves 13 and 13' are identical and the control valve 13' would function in the fluid pressure branch 7 in the event of a fluid pressure failure in the branch 6 substantially in the same manner as the control valve 13, described hereinabove. Therefore, no matter which branch of the fluid pressure system develops a leak, the operator will still have effective brakes available on one of the vehicle axles, and these brakes will be retained in their activated positions by the control valve 13 or 13' upon the application of said brakes when the fluid pressure in the reservoir 3 and the fluid pressure system 1 has dropped below the predetermined value.

From the foregoing, it is now apparent that a novel control valve meeting the objects set out hereinbefore is provided and that changes or modifications as to the precise configurations, shapes and details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing, resiliently urged means movable in said housing and defining therewith an expansible fluid pressure chamber, means within said resiliently urged means defining a pressure fluid flow passage therethrough, and valve means movable in said resiliently urged means for controlling said flow passage, said resiliently urged means being movable in response to fluid pressure in said chamber in excess of and less than a predetermined value to move said valve means toward positions permitting pressure fluid flow through said flow passage in one and other directions and in only one of said one and other directions, respectively, and abutment means on said resiliently urged means for driving engagement with said valve means, said resiliently urged means being movable in response to fluid pressure in said chamber in excess of the predetermined value to engage said abutment means with said valve means and thereafter move said valve means to the position permitting pressure fluid flow through said flow passage in the one and other directions.

2. The control valve according to claim 1 wherein said valve means is movable toward its position permitting pressure fluid flow through said flow passage in only one of the one and other directions in response to the resiliently urged means movement when the fluid pressure in said chamber is less than the predetermined value, and other abutment means on said housing for displacement preventing engagement with said first named abutment means, said first named abutment means being further movable with said resiliently urged means relative to said valve means into engagement with said other abutment means when said valve means is in its position permitting pressure fluid flow through said flow passage in one of the one and other directions.

3. The control valve according to claim 1 including a valve seat on said housing about said passage and defining the position of said valve means permitting pressure fluid flow through said flow passage in one of the one and other directions, and resilient means urging said valve means toward engagement with said valve seat.

4. A control valve comprising a housing, control means movable in said housing and defining therewith a pressure fluid flow passage therethrough, an expansible fluid pressure chamber between said control means and said housing, and valve means in said control means movable between a first position permitting uni-directional pressure fluid flow through said passage and a second position permitting bi-directional pressure fluid flow through said passage, said control means being movable in response to fluid pressure in said chamber above a predetermined value to move said valve means from the first position to the second position, a bore in said control means defining a portion of said flow passage, and a valve seat on said housing in circumscribing relation with said flow passage, said valve means being movable in said bore and engaging said valve seat when in the first position, and abutment means in said bore defining a driving connection between said control means and said valve means, said control means effecting the driving connection to move said valve means from the first position to the second position upon the movement thereof in response to fluid pressure in said chamber above the predetermined value.

5. A control valve comprising a housing, control means movable in said housing and defining therewith a pressure fluid flow passage therethrough, an expansible fluid pressure chamber between said control means and said housing, and valve means in said control means movable between a first position permitting uni-directional pressure fluid through said passage and a second position permitting bi-directional pressure fluid flow through said passage, said control means being movable in response to fluid pressure in said chamber above a predetermined value to move said valve means from the first position to the second position, a first bore in said control means, first extension means on said housing extending into said first bore, a second bore extending through said first extension means and substantially coaxial with said first bore, second extension means on said housing in opposed relation with said first extension means and extending into said first bore, a third bore extending through said second extension means and substantially coaxial with said first bore, said first, second and third bores defining said pressure fluid flow passage.

6. The control valve according to claim 5 including a valve seat on said first extension means about said second bore, said valve means being movable in said first bore and engageable with said valve seat, and a spring in said first bore urging said valve means to the first position engaging said valve seat.

7. A control valve comprising a housing having a first bore therein, a first end wall on said housing closing one end of said first bore, first extension means on said end wall extending into said first bore and having a free end portion thereon, a second bore extending through said first extension means and substantially coaxial with said first bore, a valve seat on said first extension means free end portion in circumscribing relation with said second bore, a second end wall connected with said housing and closing the other end of said first bore, second extension means on said second end wall and extending into said first bore in opposed relation with said first extension means, a third bore extending through said second extension means and substantially coaxial with said first bore, piston means having a head portion slidable in said first bore and an integral sleeve portion extending substantially coaxially therefrom, a fourth bore extending through said sleeve and head portion and having opposed ends slidably received on the peripheral portions of said first and second extension means, valve means movable in said fourth bore, first spring means urging said valve means toward said valve seat, an abutment member in said fourth bore for engagement with said valve means, said piston means defining with said housing an expansible fluid pressure control chamber between said head portion and first end wall and between said first bore and said first extension means, and second spring means urging said piston means to oppose fluid pressure expansion of said control chamber, said piston means being movable against said second spring means in response to fluid pressure in excess of a predetermined value in said control chamber to engage said abutment member with said valve means and thereafter move said valve means against said first spring means toward an open position disengaged from said valve seat to permit passage of pressure fluid through said second, third and fourth bores in one and opposite directions, and said piston means also being movable in response to the compressive force of said second spring means when the fluid pressure in said chamber is less than the predetermined value toward a position permitting the compressive force of said first spring means to effect movement of said valve means toward a closed position in engagement with said valve seat, the compressive force of said first spring means thereafter urging said valve means into engagement with said valve seat to permit passage of pressure fluid through said second, third and fourth bores in only one of the one and other directions.

8. A control valve comprising a housing, resiliently urged means movable in said housing and defining with said housing a pressure fluid flow passage therethrough and a separate expansible fluid pressure chamber, said resiliently urged means being urged toward one position in said housing when the fluid pressure in said chamber is less than a predetermined value and being movable toward another position in said housing when the fluid pressure in said chamber exceeds the predetermined value, a valve seat on said housing about said flow passage, valve means movable in said flow passage and normally urged toward engagement with said valve seat to permit only uni-directional pressure fluid flow through said flow passage when said resiliently urged means is in its one position, and other means on said resiliently urged means for engagement with said valve means, said other means being responsive to the movement of said resiliently urged means toward its other position to engage and thereafter move said valve means toward a position disengaged from said valve seat to permit pressure fluid flow through said flow passage in either direction.

9. The control valve according to claim 8, wherein said resiliently urged means includes piston means movable in said housing and defining therewith said chamber and said flow passage, and resilient means urging said piston means toward the one position, said other means being on said piston means.

10. The control valve according to claim 9, comprising passage means in said piston means defining a portion of said flow passage, said valve means being movable in said passage means.

11. The control valve according to claim 10, wherein said other means includes abutment means connected with said piston means and extending into said passage means for engagement with said valve means.

12. The control valve according to claim 10, comprising extension means on said housing and having an end portion extending into said passage means, said valve seat being on said extension means, a passage in said extension means defining a portion of said flow passage, said passage extending through said valve seat and connecting with said passage means, abutment means on said end portion of said extension means, and said other means including other abutment means connected with said piston means and extending into said passage means between said valve means and said first named abutment means, the force of said resilient means acting on said piston means urging said other abutment means toward engagement with said first named abutment means.

13. The control valve according to claim 10, comprising extension means on said housing and extending into said passage means, said valve seat being on said extension means, and a passage in said extension means defining a portion of said flow passage, said passage extending through said valve seat and connecting with said passage means.

14. The control valve according to claim 13, comprising other extension means on said housing opposed to said first named extension means and extending into said passage means, and another passage in said other extension means defining a portion of said flow passage and connecting with said passage means.

15. The control valve according to claim 14, comprising other resilient means in said passage means engaged between said other extension means and said valve means and urging said valve means toward engagement with said valve seat.

16. The control valve according to claim 15, comprising a bore in said housing, said first named and other extension means extending coaxially into said bore and including a pair of peripheral surfaces, respectively, said piston means being slidable in said bore and defining therewith said chamber, another bore in said piston means defining said passage means and having opposed ends respectively slidably received on the peripheral surfaces of said first named and other extension means.

17. The control valve according to claim 16, wherein said first named extension means includes a free end within said other bore, said valve seat being on said free end, abutment means on said free end of said first named extension means, and said other means including other abutment means connected with said piston means and extending into said other bore between said valve means and said first named abutment means, the force of said first named resilient means acting on said piston means urging said other abutment means toward engagement with said first named abutment means when said piston means is in its one position.

18. A control valve comprising a housing having a bore therein, a pair of opposed extensions on said housing extending into said bore, a pair of pressure fluid flow ports in said housing, a pair of passage means in said housing connected with said flow ports and extending through said extensions, respectively, a piston slidable in said bore and defining therewith an expansible fluid pressure chamber, a control port in said housing connected with said chamber, resilient means engaged between said housing and piston and urging said piston toward an inoperative position in said housing and opposing fluid pressure expansion of said chamber when the fluid pressure at said control port is less than a predetermined value, another bore in said piston slidably received on said extensions and connecting with said passage means, a free end portion on one of said extensions within said other bore defining a valve seat about one of said passage means, valve means movable in said other bore for engagement with said valve seat, other resilient means urging said valve means into engagement with said valve seat to permit only uni-directional pressure fluid communication between said ports when said piston is in its inoperative position, and abutment means on said piston extending into said other bore between said valve means and said free end portion and urged into engagement with said free end portion when said piston is in its inoperative position, said piston being movable against said first named resilient means toward an operative position in response to fluid pressure at said control port in excess of the predetermined value acting thereon to move said abutment means into engagement with said valve means and thereafter move said valve means toward a position disengaged from said valve seat and establishing open pressure fluid communication between said flow ports.

References Cited
UNITED STATES PATENTS 3,002,520  10/1961  Morse ---------- 251—63 XR
3,029,061  4/1962  Hoxworth --------- 251—63.4
3,359,868  12/1967  Hoffman -------- 251—63 XR WILLIAM F. O'DEA, *Primary Examiner.*

W. H. WRIGHT, *Assistant Examiner.*

U.S. Cl. X.R.

137—493, 505.47, 543.12